United States Patent
Mihori et al.

(10) Patent No.: US 9,976,026 B2
(45) Date of Patent: May 22, 2018

(54) PHENOL RESIN FOAMED PLATE

(75) Inventors: Hisashi Mihori, Tokyo (JP); Yukihiro Shimizu, Tokyo (JP); Yuuki Saito, Tokyo (JP); Yoshihito Fukasawa, Tokyo (JP)

(73) Assignee: ASAHI KASEI CONSTRUCTION MATERIALS CORPORATION, Tokyo (JP)

(*) Notice: Subject to any disclaimer, the term of this patent is extended or adjusted under 35 U.S.C. 154(b) by 0 days. days.

(21) Appl. No.: 13/879,982

(22) PCT Filed: Oct. 17, 2011

(86) PCT No.: PCT/JP2011/073871
§ 371 (c)(1),
(2), (4) Date: Jun. 28, 2013

(87) PCT Pub. No.: WO2012/053493
PCT Pub. Date: Apr. 26, 2012

(65) Prior Publication Data
US 2013/0288038 A1 Oct. 31, 2013

(30) Foreign Application Priority Data

Oct. 18, 2010 (JP) ................................ 2010-233848

(51) Int. Cl.
| | | |
|---|---|---|
| C08L 61/06 | (2006.01) |
| B29C 44/08 | (2006.01) |
| B29C 44/02 | (2006.01) |
| B29C 44/60 | (2006.01) |
| C08J 9/00 | (2006.01) |
| C08J 9/14 | (2006.01) |

(52) U.S. Cl.
CPC .............. *C08L 61/06* (2013.01); *B29C 44/02* (2013.01); *B29C 44/08* (2013.01); *B29C 44/60* (2013.01); *C08J 9/0061* (2013.01); *C08J 9/141* (2013.01); *C08J 9/145* (2013.01); *C08J 2205/044* (2013.01); *C08J 2361/04* (2013.01); *Y10T 428/249975* (2015.04)

(58) Field of Classification Search
None
See application file for complete search history.

(56) References Cited

U.S. PATENT DOCUMENTS

| | | |
|---|---|---|
| 6,476,090 B1 | 11/2002 | Arito et al. |
| 2006/0154045 A1 | 7/2006 | Hout et al. |
| 2007/0225406 A1 | 9/2007 | Hout et al. |
| 2007/0292675 A1 | 12/2007 | Hout et al. |
| 2009/0047852 A1 | 2/2009 | Takahashi et al. |
| 2010/0010111 A1 | 1/2010 | Coppock et al. |
| 2011/0263731 A1 | 10/2011 | Kitagawa et al. |

FOREIGN PATENT DOCUMENTS

| | | | |
|---|---|---|---|
| EP | 1095970 A1 | * | 5/2001 |
| JP | 10-225993 A | | 8/1998 |
| JP | 2006-28288 A | | 2/2006 |
| JP | 2006-335868 A | | 12/2006 |
| JP | 2008-24868 A | | 2/2008 |
| JP | 2008024868 A | * | 2/2008 |
| JP | 2009-293033 A | | 12/2009 |
| KR | 2001-0053372 A | | 6/2001 |
| RU | 2 315 787 C2 | | 9/2005 |
| WO | WO 99/11697 A1 | | 3/1999 |
| WO | WO 00/01761 A1 | | 1/2000 |
| WO | WO 2007029221 A1 | * | 3/2007 |
| WO | WO 2010/053093 A1 | | 5/2010 |

OTHER PUBLICATIONS

Mitsubori et al., Phenolic Resin Foam and Method for Producing the Same, Feb. 7, 2008, machine translation of JP2008-024868.*
International Search Report, dated Jan. 24, 2012, for International Application No. PCT/JP2011/073871.
International Preliminary Report on Patentability, and Translation of Written Opinion of the International Searching Authority, dated May 16, 2013, for International Application No. PCT/JP2011/073871 (Forms PCT/IB/338, PCT/IB/373 and PCT/ISA/237).

* cited by examiner

*Primary Examiner* — Chinessa T Golden
(74) *Attorney, Agent, or Firm* — Birch, Stewart, Kolasch & Birch, LLP

(57) ABSTRACT

A phenol resin foamed plate contains hydrocarbon and/or chlorinated aliphatic hydrocarbon, in which an average cell diameter is in a range of 5 µm or more and 200 µm or less, a void area ratio is 5% or less in its cross section, a density is 15 kg/m$^3$ or more and 26 kg/m$^3$ or less, and when compression is made by a 10% displacement in a direction perpendicular to the thickness direction, a recovery rate 1 minute after release of this compression is 96.0% or more and 98.5% or less and a degree of change in recovery rates C is 0.030%/hr or more and 0.060%/hr or less.

9 Claims, No Drawings

PHENOL RESIN FOAMED PLATE

TECHNICAL FIELD

The present invention relates to a phenol resin foamed plate.

BACKGROUND ART

A phenol resin foamed plate is excellent in heat insulation performance, flame retardance, and heat resistance among heat insulation materials of foamed plastic, and thus is widely used as a building material and a general industrial material. Examples of such a phenol resin foamed plate include phenol resin foamed plates (phenol foams) having high heat insulation performance that are proposed in Patent Literatures 1 and 2. It is considered that these phenol resin foamed plates can be applied for roofs, walls, and floors of buildings, for example, on which loads are less likely to be applied. In such uses, high compressive strength in the thickness direction of products is not required, and thus these phenol resin foamed plates are applicable as low-density products whose costs are relatively low.

CITATION LIST

Patent Literatures

[Patent Literature 1] PCT Application Publication No. WO 00/01761
[Patent Literature 2] US Patent Application Publication No. 2010/0010111

SUMMARY OF INVENTION

Technical Problem

However, these phenol resin foamed plates, when being filled in a roof, a wall, and a floor of a building, for example, need to be accurately precut to fit into filled portions such as between joist and joist, and then filled thereinto while being compressed in a direction perpendicular to the thickness direction of the foamed plates. In this case, if space is left at the filled portions because of poor recovery property after compression of the foamed plates, the heat insulation performance is reduced.

Accordingly, it is an object of the present invention to provide a phenol resin foamed plate that, even if compressed when being filled, can prevent heat insulation performance of a filled portion thereof from decreasing.

Solution to Problem

As a result of exhaustive research to achieve the above-described object, the inventors of the present invention found that a phenol resin foamed plate having an excellent recovery property after compression without an adverse effect on heat insulation performance under no compression or mechanical strength can be obtained by optimizing foaming and curing conditions for a phenol resin composition within a specific density range, and have completed the present invention.

More specifically, the present invention provides the following [1] to [6].

[1] A phenol resin foamed plate contains hydrocarbon and/or chlorinated aliphatic hydrocarbon, in which an average cell diameter is in a range of 5 μm or more and 200 μm or less, a void area ratio is 5% or less in its cross section, a density is 15 kg/m$^3$ or more and 26 kg/m$^3$ or less, and when compression is made by a 10% displacement in a direction perpendicular to the thickness direction, a recovery rate 1 minute after release of this compression is 96.0% or more and 98.5% or less and a degree of change in recovery rates C is 0.030%/hr or more and 0.060%/hr or less.

[2] The phenol resin foamed plate according to [1], wherein when compression is made by a 10% displacement in the direction perpendicular to the thickness direction, a middle-portion closed cell ratio 24 hours after release of this compression is 80% or more and 94% or less.

[3] The phenol resin foamed plate according to [1] or [2], wherein a middle-portion closed cell ratio is 85% or more, thermal conductivity is 0.023 W/mK or less, and brittleness is 25% or less.

[4] The phenol resin foamed plate according to any one of [1] to [3], wherein the hydrocarbon and the chlorinated aliphatic hydrocarbon are constituents of a blowing agent.

[5] The phenol resin foamed plate according to any one of [1] to [4], wherein the hydrocarbon content and/or the chlorinated aliphatic hydrocarbon content in the blowing agent is 50 wt % or more.

[6] The phenol resin foamed plate according to any one of [1] to [5], wherein the hydrocarbon is at least one selected from the group consisting of isobutane, normal butane, cyclobutane, normal pentane, isopentane, cyclopentane, and neopentane, and the chlorinated aliphatic hydrocarbon is chloropropane.

Advantageous Effects of Invention

According to the present invention, it is possible to provide a phenol resin foamed plate that, even if compressed when being filled, can prevent heat insulation performance of a filled portion thereof from decreasing.

DESCRIPTION OF EMBODIMENTS

The present invention will now be described in detail based on preferred embodiment thereof.

A phenol resin foamed plate (hereinafter, also referred to as a "foamed plate") in the present embodiment is a foamed plate in which a large number of cells are present in a distributed state in a phenol resin formed through a curing reaction. The thickness of the foamed plate is the smallest dimension of three dimensions of the foamed plate in a direction in which a foamable resin composition on a surface grows while being foamed.

The density of the phenol resin foamed plate is 15 kg/m$^3$ or more and 26 kg/m$^3$ or less, preferably 20 kg/m$^3$ or more and 25 kg/m$^3$ or less, and more preferably 18 kg/m$^3$ or more and 24 kg/m$^3$ or less. If the density is 15 kg/m$^3$ or more, mechanical strength such as compressive strength can be secured and occurrence of breakage in handling of the foam can be avoided. Accordingly, deterioration of a recovery property after compression described later can be prevented. In contrast, if the density exceeds 26 kg/m$^3$, a preferred recovery property after compression necessary for filling method cannot be expected. If the density is 26 kg/m$^3$ or lower, heat transfer through a resin part described later is less likely to increase, and thus heat insulation performance can be secured. Note that a desired value can be selected as the density of the phenol resin foamed plate, mainly based on the proportion of a blowing agent and oven conditions during curing.

The phenol resin foamed plate has relatively large (usually 1 mm or larger in diameter) spherical or amorphous vacancies (hereinafter, referred to as voids) inside. Voids are generally formed due to joining of cells, nonuniform vaporization of the blowing agent, or entrapment of air in a foaming process, for example. Even if molding is performed after curing of the blowing agent proceeds, voids may be generated. This causes reduction of compressive strength and is also unfavorable for the appearance.

Voids are defined as follows in the present specification. More specifically, when a phenol resin foamed plate is cut in parallel to its front and rear surfaces and vacancies present on the cut surface are measured by a method described later, vacancies having an area of 2 mm$^2$ or more are regarded as voids.

The phenol resin foamed plate has such few voids that the total void area is 5% or less of the total area of the cut surface. Such a phenol resin foamed plate, in which heat transfer can be stably reduced, has a significantly excellent effect that variations in compressive strength are small. In addition, because cells are uniform, the appearance thereof is also significantly excellent. A void ratio sufficiently satisfactory for physical properties and appearance is 5% or less, preferably 3% or less, more preferably 2% or less, further preferably 1% or less, particularly preferably 1% or less, and most preferably 0.5% or less.

The average cell diameter of the phenol resin foamed plate is 5 μm or more and 200 μm or less, and preferably 40 μm or more and 100 μm or less. If the average cell diameter is 5 μm or more, the increase of the foam density can be prevented. As a result, the proportion of heat transfer through the resin part in the foam can be reduced, whereby heat insulation performance of the phenol resin foamed plate can be secured. If the average cell diameter exceeds 200 μm, the thermal conductivity conversely increases due to radiation, and thus the heat insulation performance of the foam may deteriorate.

The characteristic of the phenol resin foamed plate of the present embodiment is that assuming the phenol resin foamed plate to be filled between joist and joist (filled portion), for example, when the phenol resin foamed plate is compressed in the direction perpendicular to the thickness direction by a 10% displacement, a recovery rate after 1 minute from the time of releasing the compression and a degree of change in recovery rates C are optimized. It was found that when the density of the phenol resin foamed plate is high (27 kg/m$^3$ or higher), even if the recovery rate 1 minute after release of the compression is high, the degree of change in recovery rates C tends to be low. Even if the degree of change in recovery rates C could be increased by simply increasing the amount of the blowing agent added to lower the density of the phenol resin foamed plate (26 kg/m$^3$ or lower), balance between curing and foaming would be lost and the recovery rate 1 minute after release of the compression would decrease. Accordingly, in conventional phenol resin foamed plates, even if they are ones having a high density or ones having a low density, when the phenol resin foamed plates are compressed by a 10% displacement in a direction perpendicular to the thickness direction, it is considered that none of them have simultaneously satisfied both a recovery rate 1 minute after release of the compression and a degree of change in recovery rates C required for filling method. In view of this, in the present embodiment, a phenol resin foamed plate that satisfies both the recovery rate 1 minute after release of the compression and the degree of change in recovery rates C required for filling method and has a low density has been produced by suitably controlling the progress of foaming and curing in a production process of the phenol resin foamed plate.

The recovery rate 1 minute after release of the compression is 96.0% or more and 98.5% or less, more preferably 96.1% or more and 98.0% or less, further preferably 96.5% or more and 98.0% or less, and still further preferably 97.0% or more and 98.0% or less. If the recovery rate is 96.0% or more, it is possible to avoid space from being left between the foamed plate and a joist during filling method or the foamed plate from being detached from the filled portion. Meanwhile, if the recovery rate is 98.5% or less, the speed of the recovery becomes suitable for the actual filling method. The recovery rate 1 minute after release of the compression is an index that mainly relates to ease of filling method.

The degree of change in recovery rates C is a value determined from the recovery rate 1 minute after release of the compression and the recovery rate 24 hours thereafter. More specifically, assuming that the abscissa represents time and the ordinate represents the recovery rate, the degree of change in recovery rates C is determined by calculating the slope of a line that connects the points plotted for the recovery rate 1 minute after release of the compression and the recovery rate 24 hours thereafter. The degree of change in recovery rates C is 0.030%/hr (hour) or more and 0.060%/hr or less, more preferably 0.032%/hr or more and 0.055%/hr or less, further preferably 0.032%/hr or more and 0.046%/hr or less, still further preferably 0.038%/hr or more and 0.046%/hr or less, and most preferably 0.034%/hr or more and 0.042%/hr or less. If the degree of change is 0.030% or more, it is possible to avoid space from being left between the foamed plate and a joist during filling method or the foamed plate from being detached from the filled portion. Meanwhile, by setting the upper limit of the degree of change to 0.060%/hr, the speed of the recovery becomes suitable for the actual filling method. The degree of change in recovery rates C is an index that mainly relates to ease of securing airtightness.

When the phenol resin foamed plate having the above-described characteristics is precut and then is filled in the filled portion while being compressed in a direction perpendicular to the thickness direction, the phenol resin plate can be recovered (restored) so that no space is left in the filled portion.

A middle-portion closed cell ratio 24 hours after the release of the compression performed by a 10% displacement in a direction perpendicular to the thickness direction of the foamed plate is preferably 80% or more and 94% or less. If the middle-portion closed cell ratio is less than 80%, sufficient heat insulation performance cannot be obtained, which is unfavorable. The middle-portion closed cell ratio herein means a closed cell ratio that is measured on a portion (preferably, a cylindrical sample having a diameter of 35 mm to 36 mm and a height of 30 mm to 40 mm) that has been hollowed out of the foamed plate along a direction perpendicular to the thickness direction so that a middle portion in the thickness direction of the foamed plate is contained.

The middle-portion closed cell ratio of the phenol resin foamed plate under no compression is preferably 85% or more, and more preferably 90% or more. If this closed cell ratio is lower than 85%, there is a possibility that the blowing agent in the phenol resin foamed plate is substituted with air and the heat insulation performance tend to decrease.

The thermal conductivity of the phenol resin foamed plate is preferably 0.023 W/m·K or less, and more preferably 0.019 W/m·K or less. In addition, the brittleness of the phenol resin foamed plate is preferably 25% or less.

The phenol resin foamed plate is produced from a phenol resin composition including at least a phenol resin, a blowing agent, and a curing agent.

Examples of the phenol resin include a resol-type phenol resin synthesized with an alkali metal hydroxide or an alkaline earth metal hydroxide, a novolac-type phenol resin synthesized with an acid catalyst, an ammonia resol-type phenol resin synthesized with ammonia, and a benzyl ether-type phenol resin synthesized with lead naphthenate. Among these, the resol-type phenol resin is preferred. The resol-type phenol resin is obtained by polymerizing phenol and formalin as raw materials by heating in a temperature range of 40 to 100° C. with an alkaline catalyst. An additive such as urea may be added as necessary during the resol resin polymerization. When adding urea, it is further preferable to mix a urea that is methylolated with an alkaline catalyst in advance into the resol resin. Because the resol resin after synthesis generally contains excessive water, the water content is adjusted to a level suitable for foaming, when the resin is foamed. It is also possible to add, to the phenol resin, an aliphatic hydrocarbon, an alicyclic hydrocarbon having a high boiling point, or a mixture thereof; a diluent for viscosity adjustment such as ethylene glycol and diethylene glycol; and material-recycled powder or other additives as necessary.

The starting molar ratio of phenols to aldehydes in the phenol resin is preferably in the range of 1:1 to 1:4.5, more preferably in the range of 1:1.5 to 1:2.5. In the present embodiment, examples of phenols preferably used in phenol resin synthesis include phenol itself and other phenols, and examples of other phenols include resorcinol, catechol, o-, m- and p-cresol, xylenols, ethylphenols, and p-tert butylphenol. Binuclear phenols can also be used.

As aldehydes, it is preferable to use formaldehyde itself and other aldehydes. Examples of other aldehydes that can be used include glyoxal, acetaldehyde, chloral, furfural, and benzaldehyde. As an additive, urea, dicyandiamide, or melamine, for example may be added. In the present specification, when adding these additives, the phenol resin refers to that after the additives are added.

The viscosity of the phenol resin at 40° C. is 5000 mPa·s or more and 100000 mPa·s or less, preferably 7000 mPa·s or more and 50000 mPa·s or less, and further preferably 10000 mPa·s or more and 40000 mPa·s or less. In addition, the water content is preferably 1.5 wt % or more and 30 wt % or less.

In addition to the phenol resin, the blowing agent, and the curing agent, a surfactant can be added. The surfactant and the blowing agent may be added to the phenol resin in advance, or may be added together with the curing agent.

As the surfactant, those that are generally used in production of a phenol resin foamed plate can be used. Among these, nonionic surfactants are effective. For example, alkylene oxide that is a copolymer of ethylene oxide and propylene oxide, a condensate of alkylene oxide and castor oil, a condensation product of alkylene oxide and alkylphenol such as nonylphenol or dodecylphenol, a polyoxyethylene alkyl ether having an alkyl ether moiety having 14 to 22 carbon atoms, and furthermore, fatty esters such as polyoxyethylene fatty ester, silicone-based compounds such as polydimethylsiloxane, and polyalcohols, for example, are preferred. These surfactants may be used singly or in combination of two or more. Although the amount of use is not particularly limited, these surfactants are preferably used in a range of 0.3 to 10 parts by weight per 100 parts by weight of the phenol resin.

Constituents of the blowing agent is preferred to be hydrocarbon (other than chlorinated aliphatic hydrocarbon) and chlorinated aliphatic hydrocarbon. In addition, the hydrocarbon content and/or the chlorinated aliphatic hydrocarbon content in the blowing agent is further preferred to be 50 wt % or more. The amount of blowing agent relative to the phenol resin varies depending on types of the blowing agent, compatibility with the phenol resin, and loss in foaming and curing processes, but is preferably 4.5 to 11.5 parts by weight, and more preferably 6.5 to 11.5 parts by weight. If the amount of blowing agent relative to the phenol resin is 4.5 parts by weight or larger, it is possible to produce a phenol resin foamed plate having a density of 26 $kg/m^3$ or lower. If the amount of blowing agent relative to the phenol resin is 11.5 parts by weight or smaller, it is possible to produce a phenol resin foamed plate having a density of 15 $kg/m^3$ or higher.

As the hydrocarbon, cyclic or chain alkane, alkene, and alkyne each having 3 to 7 carbon atoms are preferred. More specifically, examples thereof include normal butane, isobutane, cyclobutane, normal pentane, isopentane, cyclopentane, neopentane, normal hexane, isohexane, 2,2-dimethylbutane, 2,3-dimethylbutane, and cyclohexane. Among them, pentanes including normal pentane, isopentane, cyclopentane, and neopentane, and butanes including normal butane, isobutane, and cyclobutane are preferably used.

As the chlorinated aliphatic hydrocarbon, straight-chain or branched-chain ones each having 2 to 5 carbon atoms are used. The number of chlorine atoms bonded is not limited, but those having one to four chlorine atoms are preferably used, and examples thereof include dichloroethane, propyl chloride, isopropyl chloride, butyl chloride, isobutyl chloride, pentyl chloride, and isopentyl chloride. Among these, propyl chloride and isopropyl chloride being chloropropane are more preferably used. These chlorinated aliphatic hydrocarbons may be used singly or in combination of two or more.

The curing agent is preferably an acidic curing agent that can cure the phenol resin. However, breakage of walls (portions other than cells or voids), for example, in the foam may occur when water-containing acid is used, and thus an acid anhydride curing agent is preferred. As the acid anhydride curing agent, phosphoric anhydride and anhydrous aryl sulfonic acid are preferred. Examples of the anhydrous aryl sulfonic acid include toluenesulfonic acid, xylene sulfonic acid, phenolsulfonic acid, substituted phenolsulfonic acid, xylenol sulfonic acid, substituted xylenol sulfonic acid, dodecylbenzenesulfonic acid, benzenesulfonic acid, and naphthalene sulfonic acid, and these may be used singly or in combination of two or more. In addition, resorcinol, cresol, saligenin (o-methylolphenol), or p-methylolphenol, for example, may be added as a curing auxiliary. These curing agents may be diluted with a solvent such as ethylene glycol and diethylene glycol.

The amount of the acid curing agent used differs depending on the type and, when phosphoric anhydride is used, it is used in an amount of preferably 5 parts by weight or more and 30 parts by weight or less, more preferably 8 parts by weight or more and 25 parts by weight or less, relative to 100 parts by weight of the phenol resin. When using a mixture of 60 wt % para toluene sulfonic acid monohydrate and 40 wt % diethylene glycol, it is used in an amount of preferably 3 parts by weight or more and 30 parts by weight or less, more preferably 5 parts by weight or more and 20 parts by weight or less, relative to 100 parts by weight of the phenol resin.

A production method of the above-described phenol resin foamed plate will be described hereinafter.

The production method of the phenol resin foamed plate includes a mixing step of mixing the phenol resin composition including at least the phenol resin, the blowing agent, and the curing agent by a mixer, a discharging step of discharging the phenol resin composition mixed onto a surface material, and a foamed-plate-producing step of producing the phenol resin foamed plate from the phenol resin composition discharged on the surface material.

At the mixing step, at least the phenol resin, the blowing agent, and the curing agent are mixed by the mixer under appropriate conditions as described above. As the mixer, one disclosed in Japanese Patent Application Laid-Open Publication No. H10-225993 can be used. The number of parts of the blowing agent added relative to 100 parts by weight of the phenol resin is preferred to be 4.5 parts by weigh or more. At the discharging step, the phenol resin composition mixed at the mixing step is discharged onto the surface material.

At the foamed-plate-producing step, the phenol resin composition discharged on the surface material is preformed in a manner leveled from above and below while being foamed and cured, and then formed into a plate while being foamed and cured further.

Examples of these preforming and forming methods includes various methods depending on the object of production such as a method of utilizing a slat-type double conveyor, a method of utilizing a metal roll or a steel sheet, and a method of utilizing them in combination. Among these, when forming is performed by using the slat-type double conveyor, for example, the phenol resin composition covered with top and bottom surface materials can be, after being guided continuously into the slat-type double conveyor, pressurized from above and below while being heated, foamed and cured while being adjusted to a predetermined thickness, and thus formed into a sheet. As the surface materials used herein, a flexible surface material is preferred, and a synthetic fiber nonwoven fabric or paper is most preferred particularly in terms of handleability as a foamed plate and economical efficiency.

Heating and temperature control, as described later, can be performed through a first temperature control section and a second temperature control section that follows the first temperature control section. The heating and temperature control are desired to be performed through at least three temperature control sections in each of which residence time is 0.5 minute or more, including the first temperature control section and the second temperature control section. As the density of the phenol resin foamed plate, a desired value can be selected mainly based on the amount of the blowing agent relative to the phenol resin and oven conditions during curing, and the oven conditions during curing can be controlled based on the amount of the blowing agent relative to the phenol resin when producing the phenol resin foamed plate of the present invention.

The first temperature control section is controlled at a temperature equal to or higher than 5° C. and lower than 65° C. As a method for this temperature control, hot air, for example, may be used, or outside air temperature may be used. The first temperature control section also may be a box-like enclosed space or may be in a state open to the atmosphere. As long as desired temperature control can be performed, it does not matter if the first temperature section is an enclosed space or is partially exposed to the atmosphere. For the forming method in this section, it is preferable to use an endless steal-belt-type double conveyor, a slat-type double conveyor, or a roll, for example. The residence time in the first temperature control section is preferably 0.5 minute or more and 1 hour or less, and more preferably 2 minutes or more and 30 minutes or less in consideration of a purpose of the temperature control section. If the residence time is 0.5 minutes or longer, foaming can be sufficiently promoted. The residence time can be controlled mainly in accordance with the foaming speed. However, if the residence time is excessively long, curing becomes insufficient with respect to foaming, and thus there is a possibility that the phenol resin composition that has once inflated may deflate later. Accordingly, if the residence time is shorter than 1 hour, a risk that the thickness T1 of the phenol resin composition immediately before entering the second temperature control section described later may become smaller than a predetermined value can be reduced, and a phenol foam resin foamed plate having a predetermined density can be obtained while balance between curing and foaming is maintained.

The second temperature control section is controlled between temperatures of 65° C. or more and 100° C. or less. As a method for this temperature control, it is preferable to use mainly hot air in a box-like enclosed space. In this section, preforming may be performed by using an endless steel-belt-type double conveyor, a slat-type double conveyor, or a roll, for example. The residence time in the second temperature control section is preferred to be 5 minutes or more and 3 hours or less because foaming and curing reactions are caused to proceed herein as a main process. If the residence time is 5 minutes or longer, foaming and curing can be sufficiently promoted. When foaming and curing of the phenol resin composition have completed to a certain level, properties of the phenol resin foamed plate thus obtained hardly changes. Accordingly, if the residence time is 3 hours or shorter, production efficiency of the phenol resin foamed plate can be increased.

Assuming that the thickness of the phenol resin composition immediately before entering the second temperature control section is T1 and the thickness of the phenol resin composition after the second temperature control section is T, the ratio T1/T of T1 to T is preferably 0.2 or more and 0.7 or less, and more preferably 0.2 or more and 0.6 or less. By setting T1/T to 0.2 or higher, balance between foaming and curing in the second temperature control section can be kept, and deterioration of properties can be prevented to obtain a product having a desired thickness. In addition, by setting T1/T to 0.7 or lower, the temperature of the resin composition does not rise excessively and foaming does not proceed excessively with respect to curing, and thus the closed cell ratio of the product increases and the heat insulation performance of the product is enhanced. Adjustment of T1/T is performed mainly by changing the amount of the blowing agent relative to the phenol resin and the temperature in the first temperature control section to change T1. More specifically, by increasing the amount of the blowing agent or setting the temperature in the first temperature control section relatively high, foaming can be promoted in the first temperature control section, and T1 can be further increased. Conversely, by reducing the amount of the blowing agent or setting the temperature in the first temperature control section relatively low, foaming can be suppressed in the first temperature control section, and T1 can be further reduced. Alternatively, adjustment of T1/T can be performed also by changing the reactivity of the phenol resin or the amount of catalyst to be used to change T1. In this case, T1/T tends to increase as the amount of the blowing agent relative to the phenol resin increases, but T1/T is set to 0.7 or lower, whereby the temperature in the first temperature control section can be set relatively low. In addition, when the foaming speed is too fast, the temperature in the first temperature control section can be set relatively low. T can be controlled mainly by changing the amount of the blowing agent relative to the phenol resin, the temperature in the first temperature control section, and the temperature in the second temperature control section.

In the heating and temperature control, it is important to control the first temperature control section at a temperature equal to or higher than 5° C. and lower than 65° C. and the second temperature control section at a temperature of 65° C. or more and 100° C. or less. By this control, in a stage where the phenol resin composition is brought into the second temperature control section, the progress of foaming and curing of the phenol resin composition can be suitably controlled, and thus the recovery property after compression becomes excellent when the density of the phenol resin foamed plate is 15 to 26 kg/m$^3$. Temperature difference between the first temperature control section and the second temperature control section is preferred to be 10° C. or higher.

Examples of a preferred production method of the phenol resin foamed plate include a production method of a phenol rein foamed plate in which a phenol resin composition containing a phenol resin, a blowing agent, and a curing agent, the blowing agent contained in an amount of 4.5 to 11.5 parts by weight relative to 100 parts by weight of the phenol resin, is discharged onto a surface material, and the phenol resin composition on the surface material is heated and temperature controlled. These heating and temperature control are performed in a first temperature control section and a second temperature control section, the temperature in the first temperature control section is equal to or higher than 5° C. and lower than 65° C., the temperature in the second temperature control section is 65° C. or more and 100° C. or less, it is assumed that the thickness of the phenol resin composition immediately before entering the second temperature control section is T1 and the thickness of the phenol resin composition after the second temperature control section is T, and at least one of the amount of the blowing agent, the temperature in the first temperature control section, and the temperature in the second temperature control section is changed so that T1/T becomes 0.2 to 0.7. By this production method, the progress of foaming and curing of the phenol resin composition can be suitably controlled, and thus both the recovery rate 1 minute after release of the compression and the degree of change in recovery rates C required for filling method will be satisfied when the density of the phenol resin foamed plate is 15 to 26 kg/m$^3$.

It is further preferable to perform heating and temperature control in a third temperature control section after performing the heating and temperature control through the temperature control sections of the first temperature control section and the second temperature control section. The temperature in the third temperature control section is preferred to be 90° C. or more and 120° C. or less. If it is lower than 90° C., moisture in the foamed plate is less likely to evaporate and, if it is 120° C. or higher, the closed cell ratio decreases and the heat insulation performance of the product deteriorates. By providing the third temperature control section, it is possible to cause moisture in the phenol resin composition to evaporate after the forming is completed.

EXAMPLES

The present invention will now be described in further detail with reference to examples and comparative examples, but the present invention is not limited to these.

<Synthesis of Phenol Resin>

In a reactor, 3500 kg of 52 wt % formaldehyde and 2510 kg of 99 wt % phenol were charged and agitated by a propeller agitator. The liquid temperature in the reactor was adjusted to 40° C. by a temperature controller. Then, while adding a 50 wt % aqueous solution of sodium hydroxide, the temperature is raised to allow the liquid to react. At the stage when the Ostwald viscosity reached 60 centistokes (=60× 10$^{-6}$ m$^2$/s, measured value at 25° C.), the reaction liquid was cooled, and 570 kg of urea (corresponding to 15 mol % of the amount of formaldehyde charged) was added thereto. Subsequently, the reaction liquid was cooled to 30° C. and neutralized to pH 6.4 with a 50 wt % aqueous solution of para toluene sulfonic acid monohydrate.

This reaction liquid was dehydrated at 60° C., and the viscosity and the water content of the resultant product were measured. The viscosity at 40° C. was 5800 mPa·s and the water content was 5 wt %. This product was referred to as a phenol resin A-U.

<Moisture Percentage>

The moisture percentage in the phenol resin was measured with Karl Fischer Moisture Titrator MKA-510 (manufactured by Kyoto Electronics Manufacturing Co., Ltd.).

<Viscosity of Phenol Resin>

The measured value was obtained after stabilization for three minutes at 40° C. with a rotational viscometer (R-100 type, rotor part 3°×R-14, manufactured by Told Sangyo Co., Ltd.).

Example 1

A block copolymer of ethylene oxide-propylene oxide (Pluronic F-127, manufactured by BASF) was mixed as a surfactant in a ratio of 2.0 parts by weight relative to 100 parts by weight of the phenol resin A-U.

A waste material of a phenol resin foam (NEOMA Foam, manufactured by Asahi Kasei Construction Materials Corporation) was exfoliated and coarsely ground by a rolling ball mill (dry-type, diameter 900 mm×1500 mm), face materials were removed therefrom with a sieve (sieve opening: 1.2 mm), subsequently pulverization was performed in a compacted manner with a vibrating ball mill (dry-type, inner diameter 150 mm, 15.5 L/cylinder×two cylinders), foam powder having a large particle size was removed by a sieve (sieve opening: 0.5 mm), and then phenol resin foam powder having a bulk density of 183 kg/m$^3$ was produced. When this phenol resin foam powder was measured with a laser diffraction light scattering-type particle size analyzer, the average particle size was 26.4 μm.

This powder of 5 parts by weight was added into the phenol resin A-U of 100 parts by weight, and these were kneaded by a twin screw extruder (manufactured by TECH-NOVEL Corporation). The flow rate of this phenol resin containing phenol resin foam (written as "Resin flow rate" in Table 1) was set to 40.7 kg/hr, a composition including a mixture of 7.7 parts by weight of 50 wt % isopentane and 50 wt % isobutane as blowing agents and a mixture of 13 parts by weight of 80 wt % xylene sulfonic acid and 20 wt % diethylene glycol as acid curing agents relative to 100 parts by weight of the phenol resin containing phenol resin foam powder were fed to the mixing head temperature-controlled at 25° C., and this composition was fed onto a moving bottom surface material through a multi-port distribution tube. The mixer used was of the same type as the one disclosed in Japanese Patent Application Laid-Open Publication No. H10-225993. More specifically, the mixer has an inlet port for a resin composition of the phenol resin to which a surfactant is added and a blowing agent on the upper side surface of the mixer and also has an inlet port for a curing agent on the side surface thereof near the center of an agitation portion in which the rotor agitates. The portion following the agitation portion leads to a nozzle for discharging the foam. That is, a part to a catalyst inlet port is defined as a mixing portion (anterior portion), a part from the catalyst inlet port to an agitation-completion part is defined as a mixing portion (posterior portion), and a part from the agitation-completion part to nozzles is defined as a distribution portion, and the mixer is constructed of these portions. The distribution portion has a plurality of nozzles at the tip and is designed so that the mixed foamable phenol resin composition is evenly distributed.

The foamable phenol resin composition fed on the bottom surface material was covered with a top surface material, simultaneously fed to a 40° C. oven (first temperature control section; residence time four minutes) in a manner sandwiched between the top and bottom surface materials and preformed therein while being leveled by a plurality of rolls, subsequently sent to an 83° C. oven (second temperature control section) having a slat-type double conveyor, cured for a residence time of 15 minutes, and then cured in a 110° C. oven for two hours to obtain a phenol resin foamed plate. The foam was formed into a plate by properly applying pressure from above and below through the surface materials with the slat-type double conveyor. In the following examples and comparative examples, conditions were set such that the density could be changed while the phenol resin foamed plates were made all in the same thickness under the condition of the same forming speed as that of Example 1.

As a surface material, a nonwoven fabric made from polyester ("Span Bond E05030" manufactured by Asahi Kasei Fibers Corporation, basis weight 30 g/m², thickness 0.15 mm) was used.

Properties of foams obtained in the examples and the comparative examples were determined by the following methods.

<Density of Foamed Plate>

A phenol resin foamed plate in the shape of a 20 cm cube was used as a sample and, if a face material or siding, for example, was attached on the sample, it was removed therefrom. The density is a value obtained by measuring the weight and the apparent volume of the sample, and was measured according to JIS-K7222.

<Void>

The phenol resin foamed plate sample was cut in parallel to the front and rear surfaces at the approximate center in the thickness direction thereof, an area of 100 mm×150 mm thereof was color photocopied in 200% enlargement (each length becomes double, i.e., area becomes quadruple) and, by using a transparent graph paper with 1 mm×1 mm squares, void areas each equal to or larger than eight squares were totalized to calculate the area ratio. That is, because this is an enlarged copy, these eight squares correspond to 2 mm² on the actual cut surface of the foam.

[Closed Cell Content]

A cylindrical sample having a diameter of 35 mm to 36 mm was hollowed out of a phenol resin foamed plate with a cork borer to cut into a height of 30 mm to 40 mm, and then the sample volume was measured by a standard method for using an air comparison pycnometer (Type 1000, manufactured by Tokyoscience Co., Ltd.). The value obtained by subtracting the volume of walls (portions other than cells or voids) calculated from the sample weight and the resin density, from the sample volume was divided by an apparent volume calculated from the outer dimensions of the sample, and the resultant value was the closed cell ratio, which was measured according to ASTM-D-2856. Here, the density of the phenol resin was set to 1.3 kg/L. The middle-portion closed cell ratio 24 hours after release of the compression was measured after a cylindrical sample was hollowed out along a direction perpendicular to a compression direction (thickness direction) so that a middle portion in the compression direction of the phenol resin foamed plate was contained.

[Average Cell Diameter]

Four lines each having a length of 9 cm were drawn on a 50 time-enlarged picture of the cut surface of the sample that had been cut in parallel to the front and rear surfaces at the approximate center in the thickness direction of the phenol resin foamed plate so that these lines did not cross voids, the number of cells measured according to the number of cells crossed by each line (JIS K6402) were determined for each line, and the quotient when 1800 μm was divided by the average of the numbers thus obtained was the average cell diameter.

[Thermal Conductivity]

With a sample of 200 cm cube, a lower temperature plate at 5° C., and a higher temperature plate at 35° C., thermal conductivity was measured in accordance with a flat plate heat flow meter method of HS-A-1412.

<Brittleness>

Twelve cubes each measuring 25±1.5 mm on each side were cut out as test pieces so that each piece has a face contains a mold skin or a face material. Note that if the thickness of a phenol resin foamed plate was smaller than 25 mm, the thickness of test pieces was the thickness of the phenol resin foamed plate. Twenty four cubes each made of oak and measuring 19±0.8 mm on each side that had been dried at room temperature and 12 test pieces were put in a wooden box made of oak and having inside dimensions 191×197×197 mm that could be sealed so that dust did not leak, and this box was rotated 600±3 revolutions at a speed of 60±2 revolutions per minute. After this rotation was completed, the contents of the box were moved on a net having a nominal dimension of 9.5 mm, small pieces were removed by sieving, and the remaining test pieces were weighed. The decrease rate calculated from the weight of the test pieces before the test is the brittleness, which was measured according to JIS A9511.

<Recovery Rate after Compression>

A phenol resin foamed plate (original plate) was cut into a piece of 100±1 mm in the perpendicular length direction being perpendicular to the thickness direction, 44±1 mm in the thickness direction, and 44±1 mm in the perpendicular width direction also being perpendicular to the thickness direction, and thus a test sample was obtained. Note that on the dimension in the thickness direction of the foamed plate, if the thickness of a sample exceeded 45 mm, the sample was cut to have a thickness of 44±1 mm in the thickness direction so that the middle portion of the sample in the thickness direction matched the center of the measurement sample thickness and, if it is smaller than 44 mm, the original thickness was used for measurement. In the present embodiment, among two sides that were perpendicular to the thickness direction, the direction in which the longer side extends is assumed to be the perpendicular length direction, but the perpendicular length direction and the perpendicular width direction do not have to be determined by dimensions of sides of the test sample, and either direction may be the perpendicular length direction or the perpendicular width direction. Subsequently, the test sample was compressed by a universal tester (Shimazu Autograph AG-X) in the thickness direction and the perpendicular direction at a testing speed of 16 mm/min by a displacement of 10 mm. After the compression, the test sample was released quickly, and the sample dimension in the compression direction 1 minute after release of the compression was measured with a digital caliper (Mitutoyo ABSOLUTE Digimatic). Furthermore, the sample dimension in the compression direction 24 hours after release of the compression was measured with a digital caliper (Mitutoyo ABSOLUTE Digimatic). The recovery rate after compression was measured under a temperature condition of 22.5±2.5° C. (during compression and after release of the compression).

<Degree of Change in Recovery Rates C>

The degree of change in recovery rates C was determined from the recovery rate difference between the recovery rate 1 minute after release of the compression by a 10% displacement and the recovery rate 24 hours after release of the compression with respect to the elapsed time (unit thereof is %/hr).

Example 2

The flow rate of the phenol resin containing phenol resin foam was set to 30.0 kg/hr, and the amount of a mixture of 50 wt % isopentane and 50 wt % isobutane as blowing agents was set to 11.0 parts by weight relative to 100 parts by weight of the phenol resin containing phenol resin foam powder. Other than these, under the same condition as that of Example 1, a phenol resin foamed plate was obtained.

Example 3

The flow rate of the phenol resin containing phenol resin foam was set to 50.0 kg/hr, and the amount of a mixture of 50 wt % isopentane and 50 wt % isobutane as blowing agents was set to 5.7 parts by weight relative to 100 parts by weight of the phenol resin containing phenol resin foam powder. Other than these, under the same condition as that of Example 1, a phenol resin foamed plate was obtained.

Example 4

The flow rate of the phenol resin containing phenol resin foam was set to 46.9 kg/hr, and the amount of a mixture of 50 wt % isopentane and 50 wt % isobutane as blowing agents was set to 7.6 parts by weight relative to 100 parts by weight of the phenol resin containing phenol resin foam powder. Other than these, under the same condition as that of Example 1, a phenol resin foamed plate was obtained.

Example 5

The flow rate of the phenol resin containing phenol resin foam was set to 43.6 kg/hr, and the amount of a mixture of 50 wt % isopentane and 50 wt % isobutane as blowing agents was set to 7.8 parts by weight relative to 100 parts by weight of the phenol resin containing phenol resin foam powder. Other than these, under the same condition as that of Example 1, a phenol resin foamed plate was obtained.

Example 6

The flow rate of the phenol resin containing phenol resin foam was set to 50.0 kg/hr, the amount of a mixture of 50 wt % isopentane and 50 wt % isobutane as blowing agents was set to 4.6 parts by weight relative to 100 parts by weight of the phenol resin containing phenol resin foam powder, and the temperature in the first temperature control section was set to 62° C. Other than these, under the same condition as that of Example 1, a phenol resin foamed plate was obtained.

Example 7

The flow rate of the phenol resin containing phenol resin foam was set to 50.0 kg/hr, and the amount of a mixture of 50 wt % isopentane and 50 wt % isobutane as blowing agents was set to 6.5 parts by weight and the amount of a mixture of 80 wt % xylene sulfonic acid and 20 wt % diethylene glycol as acid curing agents was set to 9 parts by weight, relative to 100 parts by weight of the phenol resin containing phenol resin foam powder. Other than these, under the same condition as that of Example 1, a phenol resin foamed plate was obtained.

Comparative Example 1

The flow rate of the phenol resin containing phenol resin foam was set to 78.5 kg/hr, and the amount of a mixture of 50 wt % isopentane and 50 wt % isobutane as blowing agents was set to 3.0 parts by weight and the amount of a mixture of 80 wt % xylene sulfonic acid and 20 wt % diethylene glycol as acid curing agents was set to 8.2 parts by weight, relative to 100 parts by weight of the phenol resin containing phenol resin foam powder. Other than these, under the same condition as that of Example 1, a phenol resin foamed plate was obtained.

Comparative Example 2

The temperature in the first temperature control section was set to 70° C. Other than this, under the same condition as that of Example 1, a phenol resin foamed plate was obtained.

Comparative Example 3

The temperature in the second temperature control section was set to 110° C. Other than this, under the same condition as that of Example 1, a phenol resin foamed plate was obtained.

Comparative Example 4

The amount of a mixture of 50 wt % isopentane and 50 wt % isobutane as blowing agents was set to 6.1 parts by weight relative to 100 parts by weight of the phenol resin containing phenol resin foam powder, and the temperature in the first temperature control section was set to 70° C. Other than these, under the same condition as that of Example 1, a phenol resin foamed plate was obtained.

Comparative Example 5

The temperature in the first temperature control section was set to 60° C. Other than this, under the same condition as that of Example 2, a phenol resin foamed plate was obtained.

Production conditions of the phenol resin foamed plates used in the examples and the comparative examples are given in Table 1, and evaluation results of the foamed plates obtained in Examples 1 to 7 and Comparative Examples 1 to 5 are given in Table 2.

TABLE 1

|  | Resin flow rate (kg/hr) | Number of parts of blowing agent (parts) | Number of parts of catalyst (parts) | Temperature of first temperature control section (° C.) | Temperature of second temperature control section (° C.) | T1 (mm) | T (mm) | T1/T ratio |
|---|---|---|---|---|---|---|---|---|
| Example 1 | 40.7 | 7.7 | 13 | 40 | 83 | 20.1 | 44.8 | 0.45 |
| Example 2 | 30.0 | 11.0 | 13 | 40 | 83 | 27.2 | 45.1 | 0.60 |
| Example 3 | 50.0 | 5.7 | 13 | 40 | 83 | 13.4 | 45.0 | 0.30 |
| Example 4 | 46.9 | 7.6 | 13 | 40 | 83 | 15.0 | 45.0 | 0.33 |
| Example 5 | 43.6 | 7.8 | 13 | 40 | 83 | 18.2 | 44.9 | 0.41 |
| Example 6 | 50.0 | 4.6 | 13 | 62 | 83 | 14.3 | 45.0 | 0.32 |
| Example 7 | 50.0 | 6.5 | 9 | 40 | 83 | 9.0 | 45.0 | 0.20 |
| Comparative Example 1 | 78.5 | 3.0 | 8.2 | 40 | 83 | 9.3 | 45.0 | 0.21 |
| Comparative Example 2 | 40.7 | 7.7 | 13 | 70 | 83 | 35.0 | 45.1 | 0.78 |
| Comparative Example 3 | 40.7 | 7.7 | 13 | 40 | 110 | 20.0 | 45.0 | 0.44 |
| Comparative Example 4 | 40.7 | 6.1 | 13 | 70 | 83 | 32.0 | 45.0 | 0.71 |
| Comparative Example 5 | 30.0 | 11.0 | 13 | 60 | 83 | 36.3 | 44.8 | 0.81 |

TABLE 2

|  | Density (kg/m$^3$) | Recovery rate after compression (1 min later; %) | Recovery rate after compression (24 hr later; %) | Degree of change in recovery rates (%/hr) | Initial closed cell ratio (%) | Closed cell ratio after evaluation of recovery property after compression (%) | Thermal conductivity (W/mK) | Brittleness (%) | Average cell diameter (μm) | Void area ratio (%) |
|---|---|---|---|---|---|---|---|---|---|---|
| Example 1 | 21.0 | 97.3 | 98.2 | 0.038 | 98.0 | 88.2 | 0.0207 | 13.1 | 98 | 0.05 |
| Example 2 | 15.5 | 96.0 | 97.4 | 0.057 | 85.3 | 81.0 | 0.0222 | 23.0 | 140 | 0.12 |
| Example 3 | 25.8 | 98.3 | 99.1 | 0.034 | 97.0 | 93.7 | 0.0204 | 12.7 | 100 | 0.02 |
| Example 4 | 24.2 | 97.8 | 98.8 | 0.042 | 95.5 | 86.3 | 0.0207 | 12.2 | 105 | 0.03 |
| Example 5 | 22.5 | 97.7 | 98.7 | 0.04 | 95.0 | 88.0 | 0.0208 | 12.5 | 105 | 0.04 |
| Example 6 | 25.8 | 98.1 | 99.0 | 0.037 | 96.0 | 91.1 | 0.0209 | 13.9 | 110 | 0.22 |
| Example 7 | 25.3 | 98.2 | 99.1 | 0.036 | 96.8 | 92.0 | 0.0203 | 12.6 | 103 | 0.03 |
| Comparative Example 1 | 40.5 | 98.5 | 99.2 | 0.029 | 93.0 | 90.0 | 0.0213 | 13.5 | 103 | 0.01 |
| Comparative Example 2 | 23.7 | 94.8 | 95.5 | 0.029 | 83.0 | 77.3 | 0.0240 | 26.2 | 154 | 0.65 |
| Comparative Example 3 | 21.1 | 94.7 | 95.4 | 0.029 | 81.9 | 75.0 | 0.0235 | 27.3 | 158 | 0.39 |
| Comparative Example 4 | 27.0 | 95.8 | 96.5 | 0.029 | 84.0 | 78.5 | 0.0228 | 15.5 | 110 | 0.35 |
| Comparative Example 5 | 15.8 | 94.9 | 95.7 | 0.033 | 85.1 | 80.6 | 0.0228 | 24.7 | 152 | 0.47 |

The invention claimed is:

1. A phenol resin foamed plate comprising:
hydrocarbon and/or chlorinated aliphatic hydrocarbon, wherein
an average cell diameter is in a range of 98 μm or more and 200 μm or less,
a void area ratio is 0.12% or less in a cross section thereof,
a density is 15 kg/m$^3$ or more and 25 kg/m$^3$ or less, and
when compression is made by a 10% displacement in a direction perpendicular to a thickness direction thereof, a recovery rate 1 minute after release of the compression is 96.0% or more and 98.0% or less and a degree of change in recovery rates C is 0.038%/hr or more and 0.060%/hr or less.

2. The phenol resin foamed plate according to claim 1, wherein
when compression is made by a 10% displacement in the direction perpendicular to the thickness direction, a middle-portion closed cell ratio 24 hours after release of the compression is 80% or more and 94% or less.

3. The phenol resin foamed plate according to claim 1, wherein
the middle-portion closed cell ratio is 85% or more, thermal conductivity is 0.023 W/mK or less, and brittleness is 25% or less.

4. The phenol resin foamed plate according to claim 1, wherein
the hydrocarbon and the chlorinated aliphatic hydrocarbon are constituents of a blowing agent.

5. The phenol resin foamed plate according to claim 4, wherein
the hydrocarbon content and/or the chlorinated aliphatic hydrocarbon content in the blowing agent is 50 wt % or more.

6. The phenol resin foamed plate according to claim 1, wherein
the hydrocarbon is at least one selected from the group consisting of isobutane, normal butane, cyclobutane, normal pentane, isopentane, cyclopentane, and neopentane, and the chlorinated aliphatic hydrocarbon is chloropropane.

7. The phenol resin foamed plate according to claim 1, wherein the void area ratio is 0.02% or more and 0.12% or less in a cross section of the phenol resin foamed plate.

8. A method of producing a phenol resin foam plate of claim 1, the method comprising:

preforming a foamable phenol resin composition in a manner leveling it from above and below while foaming and curing it in a first temperature control section; and then forming the phenol resin composition into a plate while foaming and curing it in a second temperature control section, wherein the first temperature control section is controlled at a temperature equal to or higher than 5° C. and lower than 65° C., residence time in the first temperature control section is 0.5 minute or more and 1 hour or less, the second temperature control section is controlled at a temperature equal to or higher than 65° C. and lower than 100° C., residence time in the second temperature control section is 5 minute or more and 3 hour or less, and when thickness of the phenol resin composition immediately before entering the second temperature control section is T1 and the thickness of the phenol resin composition after the second temperature control section is T, the ratio of T1/T is 0.2 or more and 0.7 or less.

9. The method according to claim 8, wherein the first temperature control section is controlled at a temperature equal to or higher than 5° C. and lower than 60° C., and the ratio of T1/T is 0.33 or more and 0.7 or less.

* * * * *